United States Patent
Jarmon

(10) Patent No.: US 9,840,432 B2
(45) Date of Patent: Dec. 12, 2017

(54) ASSEMBLY AND METHOD FOR TRANSFER MOLDING

(71) Applicant: UNITED TECHNOLOGIES CORPORATION, Farmington, CT (US)

(72) Inventor: David C. Jarmon, Kensington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/029,322

(22) PCT Filed: Oct. 14, 2014

(86) PCT No.: PCT/US2014/060406
§ 371 (c)(1),
(2) Date: Apr. 14, 2016

(87) PCT Pub. No.: WO2015/108579
PCT Pub. Date: Jul. 23, 2015

(65) Prior Publication Data
US 2016/0229730 A1  Aug. 11, 2016

Related U.S. Application Data

(60) Provisional application No. 61/890,542, filed on Oct. 14, 2013.

(51) Int. Cl.
*C03B 19/02* (2006.01)
*B28B 1/24* (2006.01)
*B28B 3/02* (2006.01)

(52) U.S. Cl.
CPC .............. *C03B 19/025* (2013.01); *B28B 1/24* (2013.01); *B28B 3/025* (2013.01); *C03B 19/02* (2013.01);
(Continued)

(58) Field of Classification Search
CPC ... B30B 11/001; B30B 15/024; B30B 15/026; B30B 15/06; B30B 15/067;
(Continued)

(56) References Cited

U.S. PATENT DOCUMENTS 2,152,738 A * 4/1939 Jeffery ................... B28B 3/003
264/313
3,725,023 A   4/1973 Parris
(Continued)

FOREIGN PATENT DOCUMENTS

| EP | 481629 A1 | 4/1992 |
|----|-----------|--------|
| EP | 367711 B1 | 3/1993 |
| EP | 866041 B1 | 6/2002 |

OTHER PUBLICATIONS

G.S. Bibbo, P.M. Benson, C.G. Pantano, "Effect of carbon monoxide partial pressure on the high-temperature decomposition of Nicalon fibre", Journal of Materials Science 26 (1991) 5075-5080.
(Continued)

*Primary Examiner* — Jodi C Franklin
(74) *Attorney, Agent, or Firm* — Carlson, Gaskey & Olds, P.C.

(57) ABSTRACT

One exemplary embodiment of this disclosure relates to a transfer molding assembly. The assembly includes a die having a molding cavity interconnected with a reservoir. The assembly further includes a heater operable to heat the die, and a load plate configured to move under its own weight to transfer material from the reservoir into the molding cavity.

11 Claims, 2 Drawing Sheets

(52) U.S. Cl.
CPC ...... *C03B 2201/02* (2013.01); *C03B 2201/10* (2013.01)

(58) Field of Classification Search
CPC ... B30B 15/062; B30B 15/061; B30B 15/064; B30B 1/005; C04B 35/83; C03B 2215/50; C03B 2215/60; C03B 2215/69
See application file for complete search history.

(56) References Cited

U.S. PATENT DOCUMENTS

| | | | |
|---|---|---|---|
| 4,252,760 A * | 2/1981 | Foster | B28B 7/342 264/120 |
| 4,373,889 A * | 2/1983 | Brown | B28B 3/02 425/150 |
| 4,428,763 A | 1/1984 | Layden | |
| 4,470,803 A * | 9/1984 | Foster | B28B 7/342 264/320 |
| 4,615,935 A | 10/1986 | Bendig et al. | |
| 4,738,902 A | 4/1988 | Prewo et al. | |
| 4,808,076 A | 2/1989 | Jarmon et al. | |
| 5,304,031 A | 4/1994 | Bose | |
| 5,350,003 A | 9/1994 | Sonuparlak et al. | |
| 5,382,392 A * | 1/1995 | Prevorsek | C04B 35/83 264/29.5 |
| 5,401,153 A * | 3/1995 | Katagiri | B30B 15/026 425/193 |
| 5,628,938 A | 5/1997 | Sangeeta et al. | |
| 5,788,732 A * | 8/1998 | Nomura | C03B 11/08 264/1.1 |
| 5,817,161 A * | 10/1998 | Takagi | C03B 11/08 264/1.21 |
| 5,871,782 A * | 2/1999 | Choi | B29C 45/02 249/67 |
| 5,900,311 A | 5/1999 | Campanella et al. | |
| 5,972,264 A | 10/1999 | Malekmadani et al. | |
| 6,228,453 B1 | 5/2001 | Fareed et al. | |
| 6,325,608 B1 * | 12/2001 | Shivakumar | C04B 35/83 264/29.5 |
| 6,696,144 B2 | 2/2004 | Holowczak et al. | |
| 6,813,906 B1 * | 11/2004 | Hirota | C03B 11/08 425/352 |
| 7,749,568 B2 | 7/2010 | Schmidt | |
| 7,833,456 B2 * | 11/2010 | Farnworth | H01L 21/56 264/272.15 |
| 2002/0004450 A1 | 1/2002 | Gaffney et al. | |
| 2003/0111752 A1 | 6/2003 | Wood et al. | |
| 2003/0138672 A1 | 7/2003 | Bauer et al. | |
| 2003/0167819 A1 * | 9/2003 | Olsson | B21J 5/12 72/407 |
| 2004/0134232 A1 * | 7/2004 | Kainuma | C03B 11/005 65/32.5 |
| 2005/0032621 A1 * | 2/2005 | Zou | C03C 3/062 501/46 |
| 2006/0197244 A1 | 9/2006 | Simpson et al. | |
| 2006/0249877 A1 | 11/2006 | Kaneko et al. | |
| 2007/0063378 A1 * | 3/2007 | O'Donoghue | B29C 33/565 264/219 |
| 2007/0232477 A1 * | 10/2007 | Fujiwara | C03C 3/068 501/50 |
| 2008/0020193 A1 | 1/2008 | Jang et al. | |
| 2008/0199681 A1 | 8/2008 | Murphy | |
| 2008/0299385 A1 | 12/2008 | Philippe et al. | |
| 2009/0214781 A1 | 8/2009 | La Forest et al. | |
| 2011/0033263 A1 | 2/2011 | Matsubayashi | |
| 2011/0071013 A1 | 3/2011 | Newton et al. | |
| 2011/0071014 A1 | 3/2011 | Kmetz et al. | |
| 2012/0104641 A1 * | 5/2012 | La Forest | B29C 70/48 264/29.5 |
| 2013/0084389 A1 | 4/2013 | Schmidt et al. | |
| 2013/0194676 A1 * | 8/2013 | Sannokyou | C03B 11/08 359/642 |
| 2014/0339718 A1 * | 11/2014 | Damjanovic | C04B 35/522 264/29.7 |

OTHER PUBLICATIONS

Mark Van Roode et al. "Ceramic Gas Turbine Design and Test Experience", Progress in Ceramic Gas Turbine Development, vol. 1, ASME Press 2002.
T. Mah et al. "Thermal stability of SiC fibres (Nicalon)", Journal of Materials Science 19 (1984) 1191-1201.

* cited by examiner

ASSEMBLY AND METHOD FOR TRANSFER MOLDING

STATEMENT REGARDING GOVERNMENT SUPPORT

This invention was made with government support under Contract No. N-00019-12-D-0002 awarded by the United States Navy. The government has certain rights in this invention.

BACKGROUND

Ceramic material, glass material and other high temperature-resistance materials can provide desirable properties for use in relatively severe operating environments, such as in gas turbine engines. Often, such materials are used in ceramic matrix composites, such as fiber-reinforced silicon carbide composites. Such composites are typically fabricated using techniques such as polymer impregnation and pyrolysis (PIP), chemical vapor deposition (CVD), and chemical vapor infiltration (CVI). Ceramic matrix composites also include fiber reinforced glass and glass-ceramic composites. Such composites are typically formed by hot pressing.

Another known technique for forming composites is transfer molding. In a typical transfer molding process, a fiber preform is provided into a die, and a softened glass or glass/ceramic material is impregnated into the preform using a hydraulically driven ram.

SUMMARY

One exemplary embodiment of this disclosure relates to a transfer molding assembly. The assembly includes a die having a molding cavity interconnected with a reservoir. The assembly further includes a heater operable to heat the die, and a load plate configured to move under its own weight to transfer material from the reservoir into the molding cavity.

In a further embodiment of any of the above, the material softens as the material is heated by the heater, and wherein the softened material is transferred into molding cavity under the weight of the load plate.

In a further embodiment of any of the above, the material is rigid before the heater heats the material, the rigid material resisting movement of the load plate under its own weight.

In a further embodiment of any of the above, the assembly includes a control rod, and an injection ram configured to translate along the reservoir under the weight of the load plate. The control rod supports the load plate above the injection ram before the heater softens the control rod.

In a further embodiment of any of the above, the material received in the reservoir is a first material, and wherein the control rod is made of a second material different than the first material.

In a further embodiment of any of the above, the heater is configured to heat the first material to a transfer molding point before the second material reaches the transfer molding point.

In a further embodiment of any of the above, the heater is configured to heat the first material to a transfer molding point before the second material reaches a working point.

In a further embodiment of any of the above, the heater is configured to heat the first material to a transfer molding point before the second material reaches a softening point.

In a further embodiment of any of the above, the first material and the second material are glass-based materials.

In a further embodiment of any of the above, the first material has a lower viscosity than the second material at a first temperature.

In a further embodiment of any of the above, the reservoir is located above, relative to a direction of gravity, the cavity.

In a further embodiment of any of the above, the assembly includes a controller, the heater including a chamber having a plurality of heating elements, the heating elements in communication with the controller and configured to generate heat in the heater.

In a further embodiment of any of the above, the load plate is configured to move solely under its own weight to transfer material from the reservoir into the molding cavity.

Another exemplary embodiment of this disclosure relates to a method of transfer molding. The method includes heating a first material such that the material softens and is injected into a preform under the weight of a load plate.

In a further embodiment of any of the above, the method includes supporting the load plate with a control rod, and releasing at least a portion of the weight of the load plate in response to the first material reaching a predefined temperature.

In a further embodiment of any of the above, the control rod is made of a second material configured to soften at a higher temperature than the first material.

In a further embodiment of any of the above, the first material and the second material are glass-based materials.

In a further embodiment of any of the above, the first material has a viscosity at or below $10^{2.6}$ poises at a temperature of about 1500° C., and wherein the second material has a viscosity above $10^{2.6}$ poises at a temperature of about 1500° C.

In a further embodiment of any of the above, the second material has a viscosity of about $10^{7.6}$ poises at a temperature of about 1500° C.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
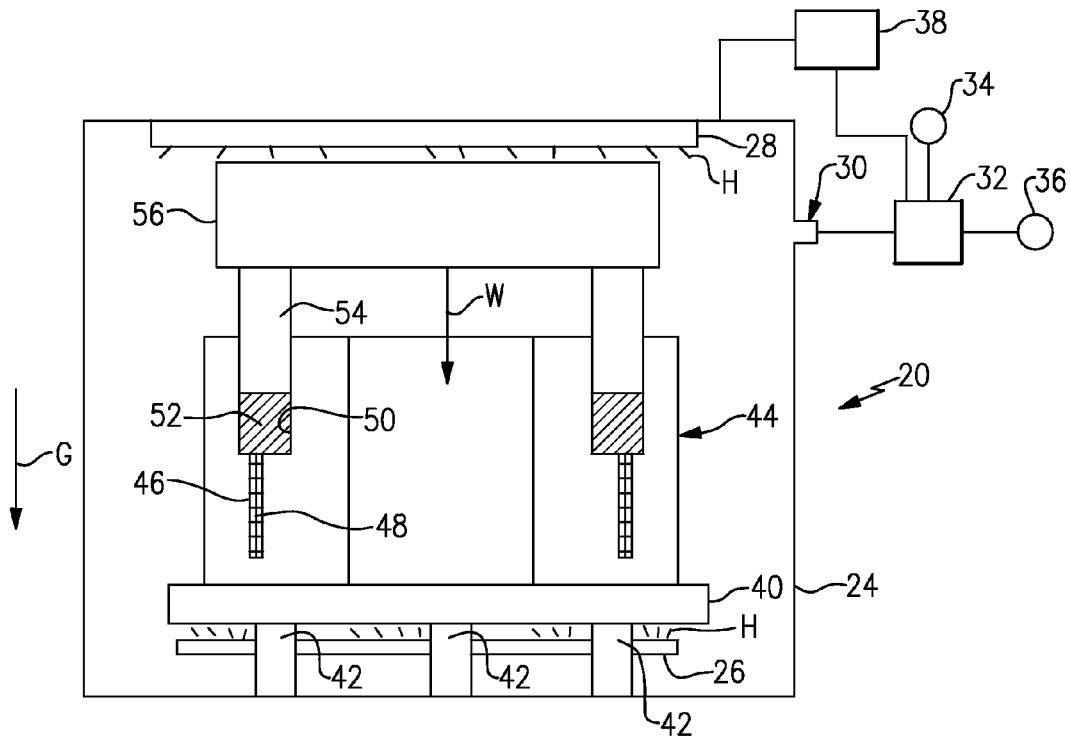
FIG. 1 illustrates an example transfer molding assembly.

FIG. 1 schematically illustrates an example assembly 20 that can be used in conjunction with a method for processing a process-environment-sensitive material (hereafter "material"), which is a material that is formed into a desired article geometry at high temperatures in a controlled environment, such as under vacuum and/or inert cover gas (e.g., argon). Such materials require high temperatures to enable formation and consolidation into the desired geometry and a controlled environment to manage reactions that can undesirably alter the chemistry of the material.

In non-limiting examples, the material can be a ceramic-based material, a glass-based material or a combination of a ceramic/glass-based material. One example includes silicon carbide fiber reinforced ceramic-glass matrix materials. The ceramic-glass matrix can be lithium-aluminosilicate with boron or barium magnesium aluminosilicate, for example. The fibers can include one or more interface layers, such as carbon or boron nitride layers. These and other process-environment-sensitive materials can be rapidly processed into an article using the assembly 20.

In the illustrated example, the article being formed is an annular engine component. Example annular components include turbine rings, rub strips, seals, acoustic tiles, combustor liners, shrouds, heat shields, etc. It should be understood that this disclosure is not limited to annular articles, and extends to articles having other shapes.

In this example, the assembly 20 provides a transfer molding assembly. The assembly 20 includes a chamber 24 and a plurality of heaters 26, 28 provided therein. It should be noted that although two heaters 26, 28 are illustrated, there may be any number of heaters, including only one heater. The heaters 26, 28 are configured to provide heat H, which raises the temperature within the chamber 24. While only one chamber 24 is illustrated, the assembly 20 could include additional chambers.

The chamber 24 is connected, through a port 30, to a gas environment control device 32, which is in turn in communication with a vacuum pump 34 and/or a pressurized gas source 36. The gas environment control device 32 is controlled by command of a controller 38, which is configured to control evacuation of, and process gas flow into, the chamber 24. Thus, for a given process having a predefined controlled gas environment, the controller 38 can purge the interior of the chamber 24 of air, evacuate the interior to a desired pressure and/or provide an inert process cover gas to a desired pressure.

The assembly 20 further includes a support plate 40 located within the chamber 24, which may be supported by a plurality of legs 42. A die 44 is provided on the support plate 40. In this example, the die 44 includes a molding cavity 46 and a reservoir 50 above, relative to the direction of gravity G, the molding cavity 46. The molding cavity 46 is in fluid communication with the reservoir 50, as will be appreciated from the below.

In FIG. 1, a fiber preform 48 is provided in the molding cavity 46, and a material 52 is placed in the reservoir 50. An injection ram 54 is provided above the material 52. The injection ram 54 is shaped to correspond to the shape of the reservoir 50, and to travel within the reservoir in the direction of gravity G. The injection ram 54 in one example is sealed against the side walls of the reservoir 50 to prevent the material 52 from escaping during injection. Optionally, there may be an exit port at the bottom of the reservoir 50, or at the bottom of the molding cavity 46, for directing excess material 52 away from the preform 48.

A load plate 56 is provided above the injection ram 54, and is in direct contact with the injection ram 54 in this example. The load plate 56 may be rigidly attached to the injection ram 54 in some examples. In other examples, however, the load plate 56 is moveable relative to the injection ram 54. The weight and/or size of the load plate 56 can be adjusted depending on the properties associated with the particular material being worked upon.

Before heat is applied to the die 44, the material 52 may be a plurality of rigid glass cutlets. These rigid cutlets resist the weight W of the load plate 56. In order to inject the material 52 into the preform 48, the controller 38 activates the heaters 26, 28 to increase the temperature within the chamber 24. In response, the temperature of the material 52 rises, which decreases the viscosity of the material 52, and the material 52 softens.

The softened material 52 is injected into the fiber preform 48 under at least a component of the gravitational weight W of the load plate 56, via movement of the injection ram 54 in the downward direction. The load plate 56 is unforced by a mechanical actuator (such as that commonly associated with a hot press assembly). In other words, the softened material 52 is injected solely under the weight of the load plate 56. After injection, the preform 48 and the material 52 provide are allowed to cool, and may undergo further processing, as needed, to prepare the article for use.

The chamber 24 provides a controlled gas environment for the application of heat, which could otherwise cause undesired reactions in the material (e.g., the preform 48, or the material 52) or degrade the die 44 or other structures of the chamber 24, particularly if the die 44 is made of graphite.

While the assembly illustrated in FIG. 1 may be effective, the material 52 may be prematurely injected into the preform 48 depending on a number of factors, including the composition and properties of the material 52. In particular, in some instances, the weight W of the load plate 56 may urge the glass 52 into the preform 48 before the material 52 has been heated to viscosity to avoid or limit damaging the preform 48. Thus, the force of the flow into the preform 48 could alter the fiber orientations of the preform 48, or even physically damage the fibers.

Figure 2:
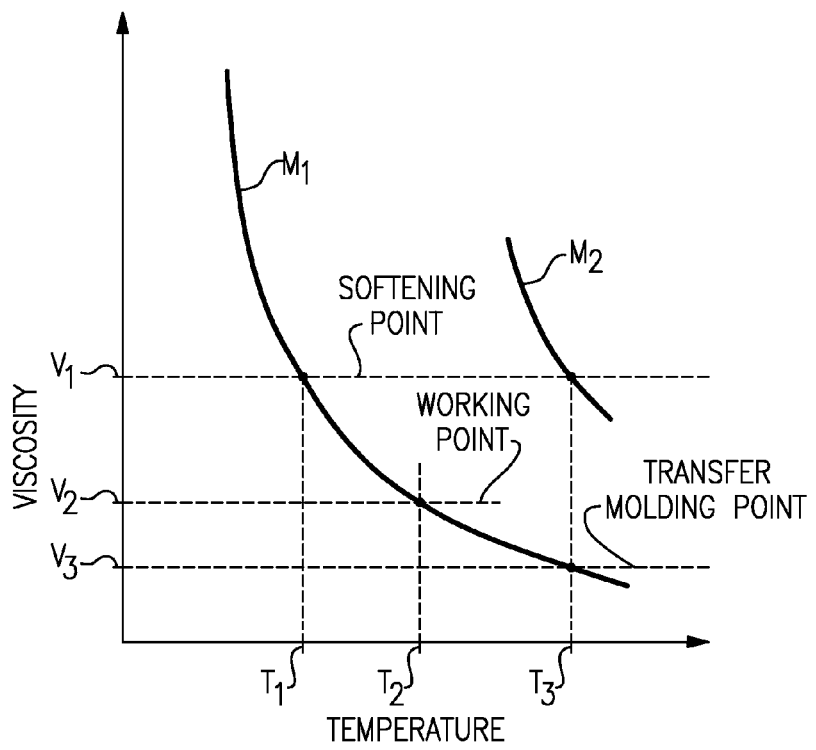
FIG. 2 graphically illustrates the relationship between viscosity and temperature for two example materials.

The relationship between viscosity and temperature for an example material $M_1$ is illustrated in FIG. 2. In one example, the material $M_1$ is used as the material 52 in FIG. 1, and as the material 152 in FIG. 3. The material $M_1$ in one example is a glass-based material, which is initially in the form of glass cutlets. The material $M_1$ experiences softening at a temperature of about 750° C. (about 1382° F.), wherein the material $M_1$ has a viscosity $V_1$ of about $10^{7.6}$ poises (about 580 reyn). This point is illustrated in FIG. 2 as the "Softening Point," which is associated with a viscosity at which uniform fibers (e.g., 0.55-0.75 mm [about 0.02-0.03 inches] in diameter and 23.5 mm [about 0.93 in] long) in a material (e.g., such as silicate fibers) elongate under their own weight at a rate of 1 mm (about 0.04 inches) per minute.

As the temperature of the material $M_1$ continues to rise, the material $M_1$ achieves a working point viscosity $V_2$ of about $10^4$ poises (about 0.15 reyn), at temperature $T_2$ of about 1100° C. (about 2010° F.). The "Working Point" illustrated in FIG. 2 corresponds to a viscosity level where a material is soft enough for hot working.

Finally, the material $M_1$ reaches a viscosity of $10^{2.6}$ poises (about 0.006 reyn) at $V_3$, at which point the material $M_1$ is in a substantially fluid state such that it is acceptable for glass transfer molding. The viscosity $V_3$ is reached at about 1500° C. in this example, and is referenced as a "Transfer Molding Point." Any viscosity at or below $V_3$ is acceptable for transfer molding. It should be understood that the illustrated material $M_1$ is only one example material, and materials having other characteristics come within the scope of this disclosure.

Figure 3:
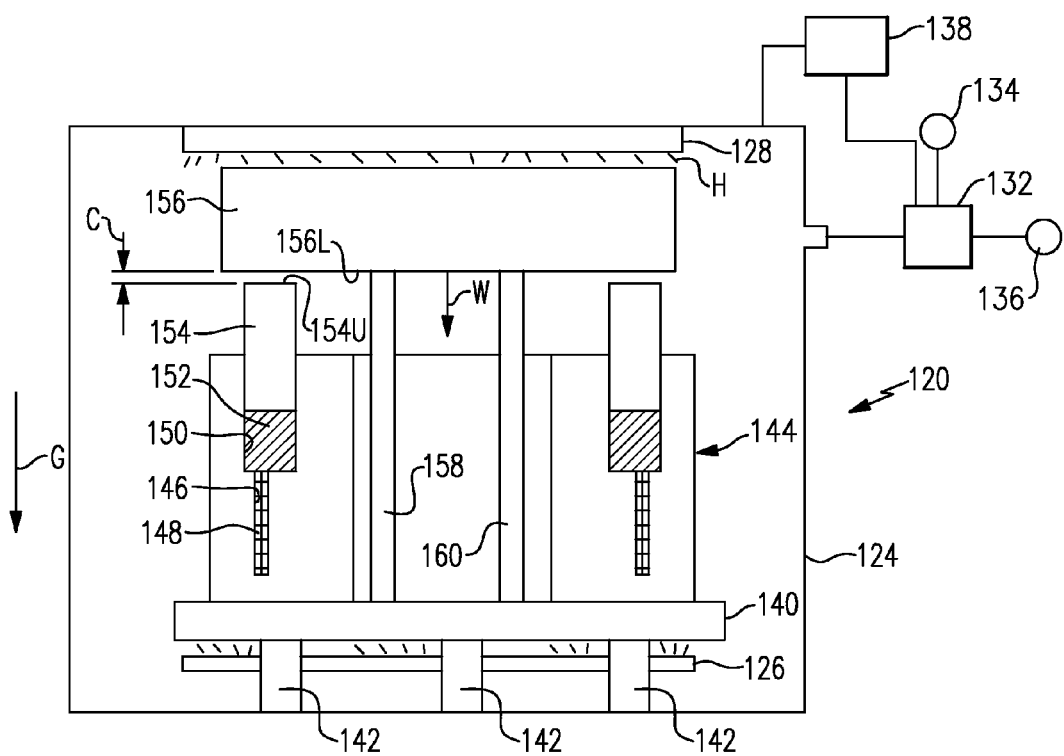
FIG. 3 illustrates another example transfer molding assembly.

FIG. 3 illustrates another example assembly 120 according to this disclosure. To the extent not otherwise described or shown, the reference numerals in FIG. 3 correspond to the reference numerals of FIG. 1, with like parts having reference numerals preappended with a "1."

In the assembly 120 of FIG. 3, a plurality of control rods 158, 160 are configured to delay a force transfer from the load plate 156 to the material 152. In particular, the control rods 158, 160 support the load plate 156 above the injection ram 154 before the material 152 is heated. That is, before heating, there is an initial clearance C between an upper surface 154U of the injection ram 154 and a lower surface 156L of the load plate 156.

In one example, the control rods 158, 160 are made of a material $M_2$, illustrated in FIG. 2, and the material 152 is made of the material $M_1$. With reference to FIG. 2, the material $M_2$ of the travel control rods 158, 160 is initially rigid, and does not reach the softening point viscosity $V_1$ until temperature $T_3$, which is the temperature for preparing the material $M_1$ of the material 152 for transfer molding at the viscosity $V_3$.

At a minimum, the material $M_2$ is selected such that it has a viscosity greater than $V_3$ at temperature $T_3$. In another example, the material $M_2$ has a viscosity of about $V_2$ at temperature $T_3$. In still another example, the material $M_2$ is rigid and has a viscosity above the softening point viscosity $V_1$ at temperature $T_3$.

At any rate, in the example of FIG. 3, the weight W of the load plate 156 does not transfer to the injection ram 154 until a point at which the material 152 has reached an acceptable transfer molding viscosity $V_3$.

In one example, the first material $M_1$ is a Corning Glass Works (CGW) 7070 glass, and the second material $M_2$ is CGW 7913 glass. This disclosure is not limited to these two particular glass types, however, and it should be understood that other materials come within the scope of this disclosure.

In either of the example assemblies 20, 120, the expenses typically associated with transfer molding, such as purchasing a relatively expensive hot press (including the corresponding hydraulics, etc.), are eliminated. The transfer molding assembly and method discussed herein allow for passive injection by the weight of the load plate 56, rather than active injection by way of a hydraulic actuator. Accordingly, this disclosure can be relatively easily incorporated into a chamber (e.g., a furnace) which is relatively more available, and less expensive than a hot press, which in turn reduces manufacturing costs, etc.

Although the different examples have the specific components shown in the illustrations, embodiments of this disclosure are not limited to those particular combinations. It is possible to use some of the components or features from one of the examples in combination with features or components from another one of the examples. Further, it should be understood that terms such as "above," "downward," etc., are used herein for purposes of explanation, and should not otherwise be considered limiting. Also, as used herein, the term "about" is not a boundaryless limitation on the corresponding quantities, but instead imparts a range consistent with the way the term "about" is used by those skilled in this art.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A transfer molding assembly, comprising:
   a die including a molding cavity interconnected with a reservoir;
   a heater operable to heat the die;
   a load plate configured to move under its own weight to transfer material from the reservoir into the molding cavity;
   a control rod; and
   an injection ram configured to translate along the reservoir under the weight of the load plate, the control rod supporting the load plate above the injection ram before the heater softens the control rod.

2. The assembly as recited in claim 1, wherein the material received in the reservoir is a first material, and wherein the control rod is made of a second material different than the first material.

3. The assembly as recited in claim 2, wherein the heater is configured to heat the first material to a transfer molding point before the second material reaches the transfer molding point.

4. The assembly as recited in claim 3, wherein the heater is configured to heat the first material to a transfer molding point before the second material reaches a working point.

5. The assembly as recited in claim 4, wherein the heater is configured to heat the first material to a transfer molding point before the second material reaches a softening point.

6. The assembly as recited in claim 2, wherein the first material and the second material are glass-based materials.

7. The assembly as recited in claim 2, wherein the first material has a lower viscosity than the second material at a first temperature.

8. A method of transfer molding, comprising:
   heating a first material such that the material softens and is injected into a preform under the weight of a load plate: and
   supporting the load plate with a control rod, and releasing at least a portion of the weight of the load plate in response to the first material reaching a predefined temperature, wherein the control rod is made of a second material configured to soften at a higher temperature than the first material.

9. The method as recited in claim 8, wherein the first material and the second material are glass-based materials.

10. The method as recited in claim 8, wherein the first material has a viscosity at or below $10^{2.6}$ poises at a temperature of about 1500° C., and wherein the second material has a viscosity above $10^{2.6}$ poises at a temperature of about 1500° C.

11. The method as recited in claim 10, wherein, at a temperature of about 1500° C., the second material has a viscosity of about $10^{7.6}$ poises.

* * * * *